Dec. 22, 1959  F. G. WILLEY ET AL  2,918,581
AIRCRAFT VELOCITY-ALTITUDE METER
Filed Dec. 13, 1956
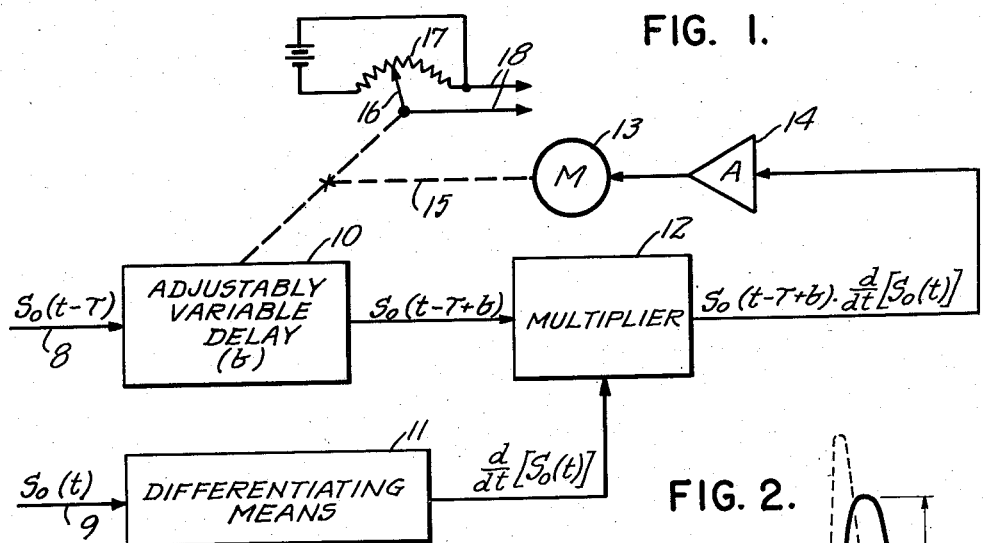
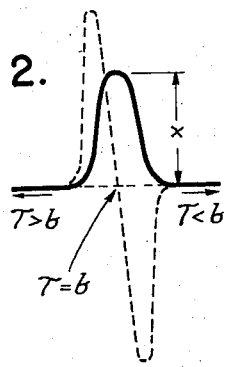
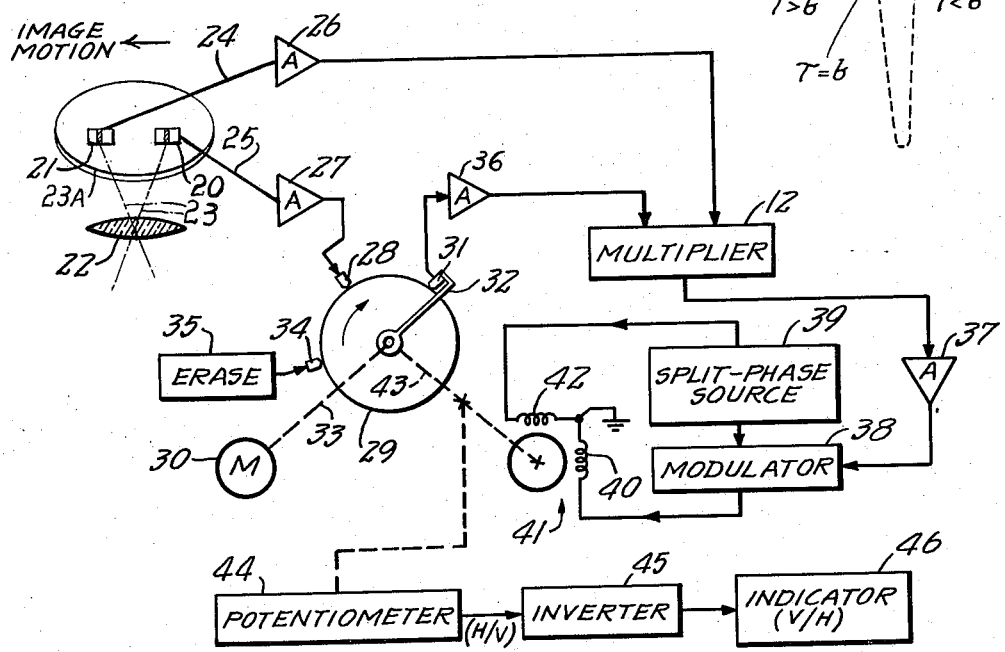
INVENTORS
FRANK G. WILLEY
FRANCIS D. GREENLEAF
BY
*Mitchell & Bechert*
ATTORNEYS United States Patent Office 2,918,581
Patented Dec. 22, 1959

2,918,581

AIRCRAFT VELOCITY-ALTITUDE METER

Frank G. Willey, East Hills, Roslyn Heights, and Francis D. Greenleaf, Syosset, N.Y., assignors to Servo Corporation of America, New Hyde Park, N.Y., a corporation of New York Application December 13, 1956, Serial No. 628,172

5 Claims. (Cl. 250—83.3)

Our invention relates to an improved correlation computer and has particular application to an airborne scanner including automatic means for determining the velocity-altitude function (or v./h. rate) of an aircraft.

It is an object of the invention to provide an improved device of the character indicated.

It is also an object to provide a simplified and improved correlation computer.

Another object is to provide an improved correlation computer which is inherently polarity-sensitive, that is, a computer which can yield an output of one sign (polarity) reflecting a first directional deviation (between two closely related signal functions) away from maximum correlation, and yielding an output of opposite sign (polarity) reflecting a second deviation (between the same signal functions) in the opposite direction away from maximum correlation.

It is another object to provide an improved automatic means for continuously determining the velocity-altitude function of an aircraft.

It is a further object to meet the above objects with a device which is completely passive (i.e., essentially non-radiating).

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified electrical diagram schematically showing significant components of an automatic correlation device of our invention;

Fig. 2 is a graphical representation of a correlation function and of a related function developed by our invention; and Fig. 3 is a diagram similar to Fig. 1 but illustrating application of the invention to an airborne velocity-altitude meter.

Briefly stated, our invention contemplates an improved correlation computer for continuously evaluating the extent of correlation between two closely similar functions of the same variable. In the forms to be described, the two similar functions vary with respect to time and differ from each other by an unknown time displacement which is to be ascertained by the automatic mechanism of our invention. We introduce an adjustably variable delay in that function which leads the other function, so that there may then be said to be two closely synchronous similar functions. We then differentiate one of said closely synchronous functions (to the exclusion of the other) with respect to time, and multiply the undifferentiated function by the differentiated function, thus developing an output signal exhibiting a "null" (i.e., passing through zero) when the adjusted delay produces maximum correlation, and oppositely polarized for adjusted delays shorter or longer than necessary to produce maximum correlation. Thus, the instantaneous magnitude and polarity of the product curve can be utilized for corrective adjustment of delay, to the extent of achieving full correction (balance) at a delay which corresponds to maximum correlation.

Referring to Fig. 1 of the drawings, our invention is shown in application to a simple circuit for continuously evaluating the unknown time displacement $\tau$ between two closely similar functions, an early function $S_0(t-\tau)$, and a later function $S_0(t)$, available respectively in the inputs 8—9; the signals at inputs 8—9 may be electrical video signals in separate lines 8—9. The leading function is subjected to an adjustably variable delay $b$ at delay means 10 so that, when one compares the output of the delay means 10 with the undelayed function, there result two closely synchronous similar functions of the same variable (time). In accordance with our invention, we subject one of these closely synchronous functions to differentiation with respect to the variable (time), and in the form shown, it is the undelayed signal which is fed to differentiating means 11. We then multiply, at 12, the differentiated signal by the undifferentiated signal, and thereby develop the following product:

$$S_0(t-\tau+b) \cdot \frac{d}{dt}[S_0(t)]$$

The integral of this product passes through zero at the point corresponding to maximum correlation (i.e., when $\tau=b$), being positive one side of this point (i.e. for one polarity of difference between $\tau$ and $b$), and negative on the other side (i.e. for the opposite polarity of difference between $\tau$ and $b$). Thus, when multiplied closely synchronous signals involve too little delay to develop maximum correlation, a product of first polarity develops at the output of multiple 12; and when the delay is too great to develop maximum correlation, a product of opposite polarity develops. This situation is graphically depicted in Fig. 2, wherein the solid curve represents the correlation function of the integrated product of two undifferentiated functions, maximum correlation being identified with a maximum amplitude $x$, when the inserted delay $d$ equals the lead time $\tau$ between the two input functions. Fig. 2 also illustrates, at the dashed curve, the integrated product of the differentiated and undifferentiated functions, said product passing through zero at $b=\tau$ and exhibiting oppositely polarized values for products involving undercorrected and overcorrected delay at 10.

In accordance with a feature of the invention, the directionally polarized output of the multiplier 12 is utilized to effect corrective adjustment of the delay inserted at 10, in the direction tending to produce continuous tracking for maximum correlation between the two signals. In the form shown, this adjustment is made by mechanical means driven by the shaft 15 of motor means 13. The amplifier 14 suggests processing of the signal appropriate for driving motor 13, and since the position of the motor shaft 15 represents the adjusted delay $b$ for which correlation is achieved, this shaft position (and, therefore, the unknown time displacement $\tau$) may be directly observed, as by noting the position of an indicator arm 16 against a scale; alternatively, the arm 16 may be part of a potentiometer 17, so that electrical output at terminals 18 may directly reflect the unknown time displacement $\tau$. In order that the delay adjusting mechanism may function in response to the time integral of the product developed at 12, it is preferred that the overall response of elements 13—14 shall be characterized by a time constant substantially longer than the shortest periodical component of $S_0(t)$, said time constant being nevertheless shorter than the shortest periodical component reflecting variation in the time displacement $\tau$.

In the arrangement of Fig. 3, we show application of the principles of our invention to a velocity-altitude computer adapted to be carried aloft by an aircraft. Such velocity-altitude computers are discussed in greater detail in copending application, Serial No. 627,810, filed December 12, 1956, in the name of Frank G. Willey and Thomas A. Westover, and for this reason the showing of Fig. 3 is simplified. For present purposes, it suffices to say that the basic input-signal functions are derived, respectively, from two energy-responsive cells or detectors 20—21. These detectors happen to be shown in the manner that is schematically representative of thermistor-flake bolometers, having sensitive areas represented by the shaded portions. Such detectors are responsive to infrared radiations, and by means of infrared transmitting optics, such as the lens 22, the sensitive areas of cells 20—21 may be imaged upon the ground, preferably directly beneath the aircraft. Also preferably, the cells 20—21 and the mounting platform 23A to which they are secured, and the lens 22, are all held in a continuously stabilized position, with the optical axis 23 oriented vertically and with the platform 23A orienting both cells 20—21 in the same downwardly facing horizontal plane. Such stabilizing mechanisms are well known and are, therefore, not necessary for the present description.

It suffices to say that the optics 22 continuously image the sensitive areas of cells 20—21 on the ground, so that with the forward motion of the aircraft, each of the sensitive areas of these cells traces substantially the same scanned path on the ground. This fact is suggested by the legend connoting image motion in the drawing. Because of the physical spacing between the sensitive areas of cells 20—21 and because they both scan substantially the same path on the ground, the image at the ground of one of them geometrically leading that of the other, they will each develop in their respective output lines 24—25, video signals which have substantially the same function of time, the only difference being that the video output of the lead cell 20 leads the video output of the trailing cell 21 by an amount proportional to the velocity-altitude function (the v./h. rate) in the aircraft.

The two outputs 24—25 may be fed to the two input-signal connections 8—9 of the circuit of Fig. 1, and the v./h. rate may in such case be determined merely by observing the output at 18. However, in the form shown in Fig. 2, we utilize the inherent differentiating property of the magnetic recording and reproducing function to achieve both adjustably variable delay and differentiation in the same piece of equipment. Thus, the output of the trailing cell 20, when suitably amplified at 26, may be fed directly to the multiplier 12, and the output of the lead cell 21 may be amplified, as necessary, at 27 for application to the recording head 28 of a continuously recycling single-channel magnetic-recording drum 29, driven by motor means 30. In the form shown, adjustably variable delay is achieved by mounting the pick-up head 31 on an arm 32 adjustably positionable about the rotating axis 33 of the recorder drum 29. An erasing head 34 electrically connected to biasing means 35 continuously reconditions the channel 29 for variable delay of fresh video, as recorded at 28.

The output of the pick-up head 31 will reflect differentiation of the video developed by the lead cell 21 and it will also reflect delay represented by the travel time for the recording material between the heads 28—31. This output may be conditioned by an amplifier 36 for supply to the multiplier 12.

In the form shown, the polarized output of the multiplier 12 is conditioned by amplifier means 37 to modulate (at 38) one of the output phases of a split-phase source 39; the modulated signal excites the control winding 40 of a directionally controllable two-phase motor 41. The other output phase of the source 39 is 90° displaced from the first output phase and excites the reference winding 42 of motor 41. The shaft output of motor 41 is connected by means 43 to reposition the arm 32, as necessary, to produce maximum correlation. At equilibrium, the shaft position at 43 will reflect the velocity-altitude function and, therefore, potentiometer 44 may develop a voltage proportional to displacement. Actually, the greater the delay, the lower the v./h. rate, so that the output of potentiometer 44 is an inverse function of v./h., meaning proportional to h./v., as noted in Fig. 3. To get a direct reading of v./h., therefore, we show an inverter 45 supplying a v./h. indicator 46.

It will be appreciated that we have described a basically simple mechanism for continuously tracking the delay between two similar functions of time, regardless of how this delay may vary as a function of time. Substantial simplification over previous methods of performing this function is achieved by electrical differentiation prior to correlation, so that the differentiating function which is necessary in evaluating a correlation is automatically performed prior to correlation. The correlation function thus is inherently such as to provide a polarized sensing signal for corrective adjustment of the delay, as necessary to permit continuous tracking.

While we have described the invention in detail for the preferred forms shown, it will be understood that modifications may be made within the scope of the invention as defined in the claims which follow.

We claim:

1. An aircraft velocity-altitude meter, comprising two energy-responsive elements, optical means for imaging said elements on the ground in an orientation such that due to the motion of the aircraft the path scanned by one of said elements coincides substantially with the path scanned by the other of said elements, said elements being physically spaced from each other such that the image of one of said elements geometrically leads that of the other on the ground, whereby said elements develop closely similar video signals which essentially differ from each other by an unknown time delay reflecting the instantaneous image motion or velocity-altitude function, means for adjustably delaying the video output of the element developing the lead image with respect to that of the other element, whereby there may be said to be available two closely synchronous similar functions of time, means for differentiating one of said functions with respect to time to the exclusion of the other of said functions, means for multiplying the resultant differential by the other of said functions, and polarity-sensitive control means responding to the output of said multiplying means and connected in corrective adjustably varying relation with said delay means, whereby the adjusted delay will continuously reflect tracking at maximum correlation and will reflect the instantaneous relation between velocity and altitude of the aircraft.

2. A device according to claim 1, and including an indicator responsive to the instantaneous corrected delay setting of said delay means.

3. An aircraft velocity-altitude meter, comprising two energy-responsive elements, optical means for imaging said elements on the ground in an orientation such that due to the motion of the aircraft the path scanned by one of said elements coincides substantially with the path scanned by the other of said elements, said elements being physically spaced from each other such that the image of one of said elements geometrically leads that of the other on the ground, whereby said elements develop closely similar video signals which essentially differ from each other by an unknown time delay reflecting the instantaneous image motion or velocity-altitude function, means for adjustably delaying the video output of the element developing the lead image with respect to that of the other element, said last defined means comprising a magnetic recording device with recording and pick-up heads, whereby inherent in the operation of said recording device the signal applied thereto is extracted therefrom as substantially the derivative of said signal with respect to time, means for multiplying the output of said recorder by the video output of the cell having the trailing image on the ground, and polarity-sensitive means responsive to the output of said multiplying means and connected in adjustably varying controlling relation with the delay between recording and pick-up at said recording means, whereby the adjusted delay will continuously reflect the instantaneous relation between velocity and altitude of the aircraft.

4. A device according to claim 3, in which said recording means comprises a continuously rotated drum with a continuous band of magnetic-recording material, a recording head and a pick-up head, one of said heads being relatively fixed and the other of said heads being adjustably fixed, whereby adjustably variable delay between recording and pick-up may be achieved.

5. The meter according to claim 1 wherein said energy responsive elements comprises thermistor-flake bolometers.

References Cited in the file of this patent

UNITED STATES PATENTS

| | | |
|---|---|---|
| 2,166,991 | Guanella | July 25, 1939 |
| 2,688,124 | Doty et al. | Aug. 31, 1954 |
| 2,718,638 | De Rosa et al. | Sept. 20, 1955 |
| 2,800,654 | De Rosa | July 23, 1957 |